Jan. 13, 1931.  A. L. McKEE ET AL  1,788,626
VEHICLE SPRING
Filed May 29, 1928
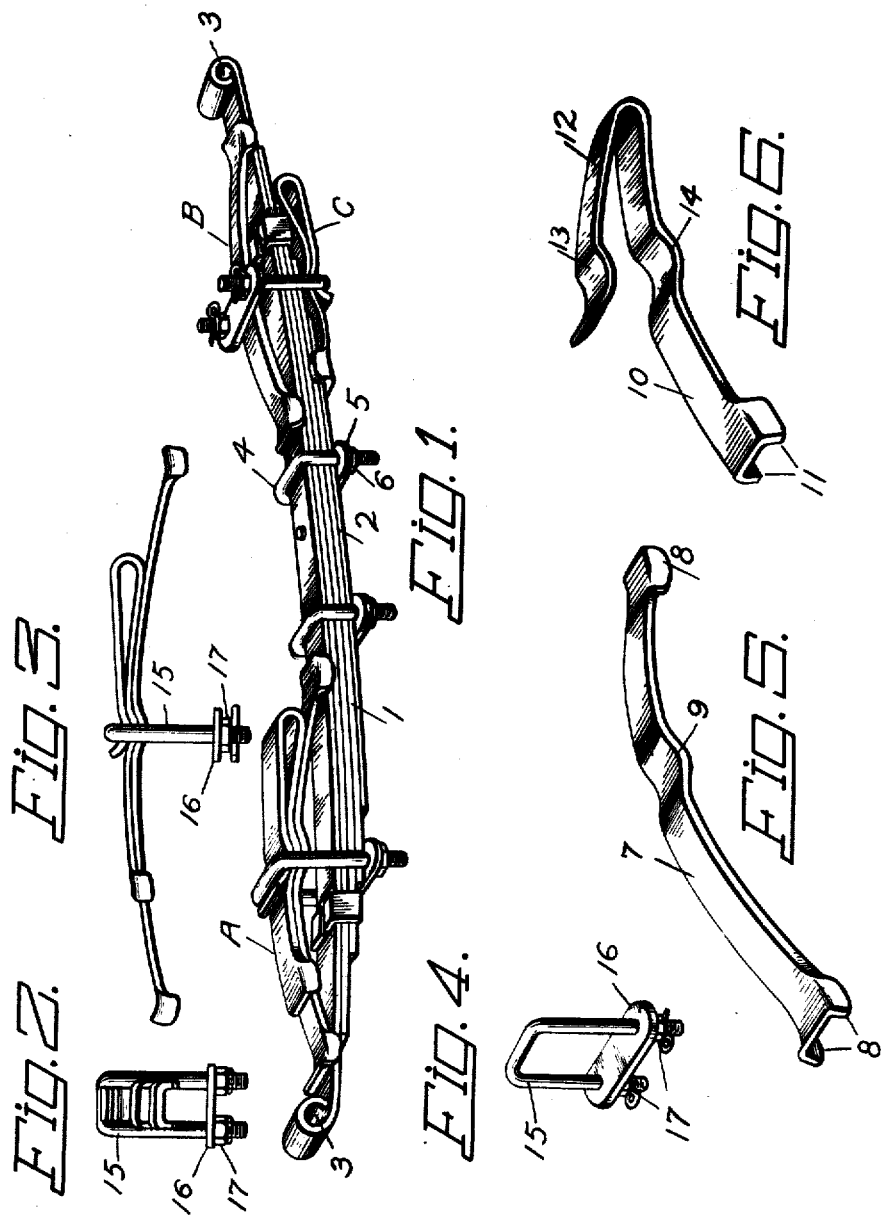
Amos L. McKee
Willard D. Campbell  Inventors
By Herbert E. Smith
Attorney Patented Jan. 13, 1931

1,788,626

UNITED STATES PATENT OFFICE

AMOS L. McKEE AND WILLARD D. CAMPBELL, OF SPOKANE, WASHINGTON

VEHICLE SPRING

Application filed May 29, 1928. Serial No. 281,497.

Our present invention relates to improvements in vehicle springs of the semi-elliptic type and designed particularly for use as shock absorbing devices for automotive vehicles. The spring device of our invention is of the semi-elliptic type comprising a plurality of main leaves and spaced auxiliary leaves near the opposite ends of the main spring which have a normal curvature opposite to that of the main leaves. Thus when the auxiliary leaves and the main spring are secured together to form the spring device for an automotive vehicle, the oppositely curved auxiliary springs exert tension near the ends of the main spring for absorbing vibration when a depressing load is imposed upon the ends of the main leaf spring.

The springs are usually placed upon the automobile chassis and extend longitudinally thereof, and the auxiliary springs of our invention are used in front of and at the rear of the central support for the main spring, and the auxiliary springs may be used either above or below the main spring, or both above and below the main spring.

The invention consists in certain novel combinations and arrangements of parts between the main semi-elliptic spring and the auxiliary springs as will hereinafter be more fully pointed out and claimed.

In the accompanying drawings, we have illustrated one complete example of the physical embodiment of our invention showing two modifications thereof, wherein the parts are combined and arranged according to the best mode we have so far devised for the practical application of the principles of our invention.

Figure 1 is a perspective view of a semi-elliptic spring having the auxiliary springs of our invention applied near its ends on top of the spring, and a single auxiliary spring is also shown below the main spring;

Fig. 2 is an end view of the assembly of one of the auxiliary springs;

Fig. 3 is a side view of the assembly of the auxiliary spring of Fig. 2;

Fig. 4 is a perspective view of one of the spring clips;

Fig. 5 is a perspective view of the base leaf of the auxiliary spring; and

Fig. 6 is a perspective view of the folded leaf of the auxiliary spring.

In carrying out our invention, we utilize the well known type of semi-elliptic spring 1 which is usually fixed to the axle of the vehicle at the central part 2 and extends longitudinally of the vehicle with shackles that are pivoted in the eyes 3 at the ends of the main spring. The usual clips 4 comprising U-bolts and clamp plates 5 and nuts 6 are used at spaced intervals on the main spring.

In Fig. 1, we have shown at A and B two of the auxiliary springs above the main spring, and at C, we have shown one of the auxiliary springs below the main spring. It will be apparent that the auxiliary springs may be used in several modified ways either above or below, or both above and below the main spring.

Each of the auxiliary springs is made up of a base leaf 7 that is bowed in usual manner, and provided at its ends with pairs of side flanges 8 to fit over the edges of the main spring to prevent lateral displacement of the auxiliary spring. At the approximate center of the leaf center, a depression 9 is provided as indicated in Fig. 5. In combination with the base leaf 7, we use a folded leaf 10 which has at one end the side flanges 11 similar to the flanges 8 of the base leaf 7. This folded leaf 10 has a fold 12 which extends to the approximate center of the leaf 10 and at its end the fold has a depression 13 which fits into the depression 14 of the leaf 10. The folded leaf also has a bowed configuration and it lies in contact with the base leaf 7, the depressions 9, 13 and 14 registering to accommodate the U-bolt 15 of the spring clip. This U-bolt lies in the depression 13 and extends along the side edges of the main spring and a clamp plate 16 on the threaded ends of the U-bolt is clamped against the adjoining face of the main spring by means of the clamp nut 17. The spring clip at the left in Fig. 1 retains the auxiliary spring at the upper surface of the main spring, and the inverted spring clip at the right in Fig. 1 retains the auxiliary spring in a modified way. At the right, the base leaf is indicated as B and located above the main spring, and the folded leaf is indicated at C and located below the main spring. In all cases, the leaves of the auxiliary spring have a configuration arranged oppositely to that of the main spring so that when the load is imposed on the main spring, the auxiliary spring devices near the ends of the main spring will absorb the shocks or vibrations as the ends of the main spring are flexed. In this manner, the bouncing or jolting usually accompanying weak springs is avoided for the reason that the shocks are absorbed and excessive flexing of the main spring is prevented.

The folded auxiliary spring serves in taking up the slack and maintaining a constant pressure on the spring clip 15, serving also to prevent movement or displacement of the clip when the main spring is under extreme depressment. It serves also to ease or absorb any shock incident to an extreme depressed main spring when otherwise the clip would hang free and on the up-throw contact with considerable force.

Having thus fully described our invention, what we claim as new and desire to secure by Letters Patent is—

1. The combination with a main leaf spring, of an auxiliary spring device comprising a base leaf having side flanges to engage the main spring and a central depression, a folded leaf on the base leaf having side flanges for engagement with said leaf, and a spring clip for fastening the auxiliary spring device to the main spring.

2. The combination with a main leaf spring, of an auxiliary spring device comprising a base leaf having a central depression and pairs of side flanges at its ends, said leaf having a curvature opposite to that of the main spring, a folded leaf having a depression at its folded end and a second depression alined therewith to seat in the depression of the base leaf, side flanges on the folded leaf for engagement with the base leaf, and a spring clip for securing the auxiliary spring to the main spring.

In testimony whereof we affix our signatures.

AMOS L. McKEE.
WILLARD D. CAMPBELL.